March 12, 1963 S. B. F. CARLSTEDT 3,080,952
VALVE DEVICE OPERATED BY REVERSIBLE ELECTRIC MOTOR
Filed Nov. 25, 1958 2 Sheets-Sheet 1

INVENTOR.
Sven Borge Fredrik Carlstedt
BY Jarvis C. Marble
ATTORNEY

March 12, 1963 S. B. F. CARLSTEDT 3,080,952
VALVE DEVICE OPERATED BY REVERSIBLE ELECTRIC MOTOR
Filed Nov. 25, 1958 2 Sheets-Sheet 2

United States Patent Office 3,080,952
Patented Mar. 12, 1963

3,080,952
VALVE DEVICE OPERATED BY REVERSIBLE
ELECTRIC MOTOR
Sven Borje Fredrik Carlstedt, 29 Skeppargatan,
Stockholm, Sweden
Filed Nov. 25, 1958, Ser. No. 776,322
2 Claims. (Cl. 192—.02)

This invention relates to a valve device.

More particularly this invention relates to a valve device operated by a reversible electric motor.

Still more particularly this invention relates to a valve device operated by a reversible electric motor, the movable valve member of which valve device is brought toward open or closed position by the rotatable part of the motor changing its direction of rotation, the movement being imparted to the valve member by way of a power transmitting device, such for example as a reduction gear.

Reversible electric motors generally have a poor starting torque, especially such motors which are controlled by means of a single-throw switch. It is known to avoid the effect of the poor starting torque by disengaging the motor in the two limit positions of the valve member so as to allow the motor to start while running free. This known construction represents an improvement especially in such remote-controlled valve devices, in which the movable valve member takes only two positions, that is, one limit position in which the valve is completely open and a second limit position in which the valve is completely closed.

Such known construction is not applicable to such control processes where the valve member has to take intermediate positions between the limit positions. One main object of the present invention is to provide a valve device of the kind specified which operates very satisfactorily even in control processes where the movable valve member is intended to take intermediate positions between the limit positions.

A further object of the invention is to provide a valve device of the kind specified which permits a continuous control with the valve member reciprocating between the limit positions.

A still further object of the invention is to provide a valve device of the type specified which is capable of operating without limit switches for actuating the motor in the limit positions of the valve member.

A still further object of the invention is to provide a valve device of the kind specified which when used for regulating purposes avoids over-regulating by feed-back action.

Figure 1:
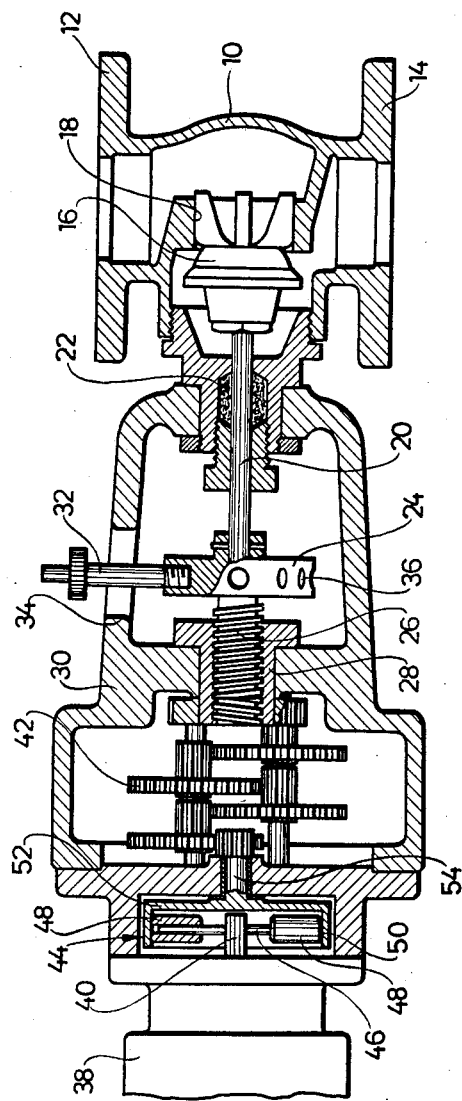
Figure 2:
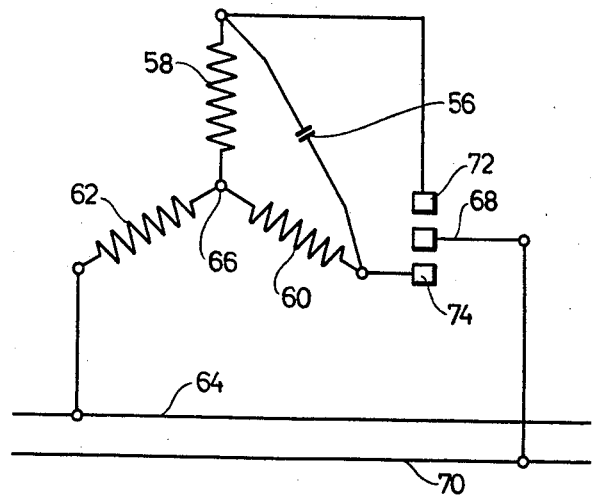
Figure 3:
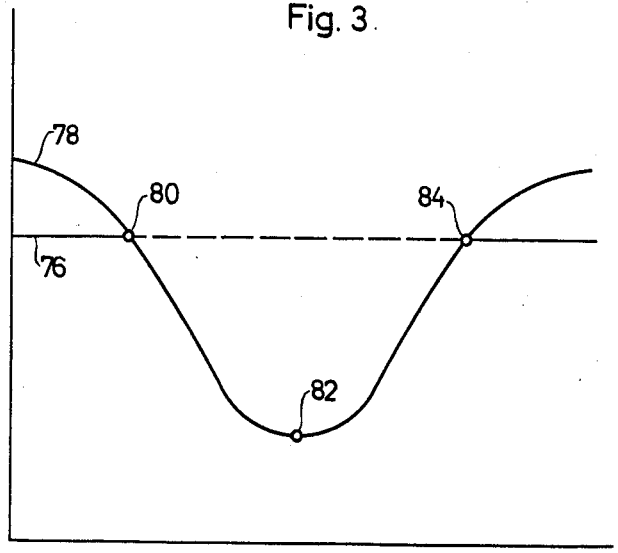

Further objects and advantages of the invention will become apparent from the following specification considered in connection with the accompanying drawings, which form part of this specification and of which:

FIG. 1 is a longitudinal sectional view of a valve operating mechanism constructed according to the invention, FIG. 2 shows a wiring diagram for the motor and FIG. 3 is a diagram.

Referring to the drawings and in particular FIG. 1, reference numeral 10 denotes a valve casing part connected by means of flanges 12, 14 to a conduit (not shown) passed by a medium, such as steam or a liquid, with a rate of flow controlled by the valve. In the valve casing a valve member 16 is movable axially and closes or opens more or less, depending upon its position, the passage for the medium through a channel 18 formed in the valve housing. The valve member 16 has a spindle 20 which passes through a stuffing box 22 and is rigidly secured to a disc 24 carrying a threaded stem 26. Said stem 26 is screwed into a nut 28 which is rotatable but held axially in a second casing part 30. The valve member 16 is prevented from rotating by means of a pin 32 passing through an axial slot 34 in the casing part 30, said slot being sufficiently long to allow unrestricted axial movement of the valve member. The disc 24 has a plurality of radial holes 36 evenly distributed around the periphery thereof, the pin 32 being screwed into one of such holes. The nut 28 is rotated by the output shaft 40 of an electric motor 38 by means of a power transmitting device, such as a reduction gear 42. Upon removal of the pin 32 the disc 24 may be turned manually by means of the holes 36, independently of the reduction gear 42 which is of known construction.

Interposed between the reduction gear 42 and the shaft 40 is a centrifugal friction clutch generally designated 44. Said clutch comprises a pin 46 disposed perpendicularly to and driven by the shaft 40, and cylindrical weights 48 which are axially slidable upon said pin 46. These weights are adapted to co-operate with the cylindrical inner surface 50 of a cup-shaped clutch housing 52 made of metal, preferably light metal, and provided with a stub shaft 54 connected to the first pinion of the reduction gear 42. The weights 48 are preferably made of some non-metallic material, such as hard rubber, and are pressed when rotated by centrifugal force against the surface 50. When the speed, and as a consequence the pressure of the weights against the clutch housing reaches a predetermined value, the frictional torque becomes large enough to cause the clutch housing 52 to rotate with shaft 40. As the stem 26 and thus also the valve member 16 are held against rotation, the rotational movement imparted to the nut 28 will cause the stem 26 and the valve member 16 to move axially.

The motor 38 is a single phase capacitor motor of the reversible type, as will be understood from the wiring diagram in FIG. 2. In said figure reference numeral 56 denotes the capacitor which is cut in between two of the three field windings 58, 60 and 62 displaced in relation to one another. One of the power supply leads 64 is connected to the winding 62 from which the current is distributed over the star centre 66 to the windings 58 and 60. Reference numeral 68 denotes a unipolar switch arm which is connected to the other power supply lead 70. Accordingly as the arm 68 engages a contact 72 or a contact 74 the winding 58 or 60, respectively, is connected to the power supply lead 70. Then the capacitor 56 creates a phase displacement which causes the torque to be reversed.

Referring to FIG. 3, the ordinate represents the torque applied by the motor shaft 40 and the abscissae represents the time, or the total number of revolutions of the shaft 40 per unit time. In order for the clutch to be capable of moving the valve member 16 it is necessary for a torque having a value 76 be applied to the clutch housing 52. The motor receives impulses from a bulb or sensing member (not shown) such as a thermal relay, which in turn is affected by the medium whose state, such as temperature, is to be adjusted by means of the valve. Assuming that the power circuit of the motor is closed, the torque delivered by the shaft 40 will be greater than the value 76, as will be seen from the portion 78 of the curve. If now the current to the motor is cut off by an impulse from the sensing member, the speed of the motor shaft drops and as a consequence the torque also decreases. At point 80 the torque value 76 is passed. The torque then drops still further and becomes too weak to turn the clutch housing 52, which means that the valve member 16 stops. At point 82 the motor has stopped. This condition may remain for any period of time, but in accordance with FIG. 3 it is assumed that the contact arm 68 has been reversed immediately. The motor reverses its direction of rotation while its torque is increasing but only upon reaching the point 84 the valve member 16 is started again, but now in the opposite direction. Thus the motor has been disengaged from the valve member during the periods of stopping and starting, when its torque is weak.

As will be understood from the foregoing description the valve member is always kept disengaged from the motor when a re-adjustment of the valve member 16 is required, provided that the speed of the motor is below a predetermined value. It will further be understood that in the absence of the device according to the present invention the motor must be made so strong that its starting torque, which according to FIG. 3 corresponds to the distance of point 82 from the abscissae, should be at least as great as the torque 76. Unless the bulb or sensing member has delivered an impulse, the motor will be running when the valve member reaches its limit positions. The clutch 44 will then operate to prevent the motor from being overloaded.

While one more or less specific embodiment of the invention has been shown and described, it is to be understood that this is for purpose of illustration only and that the invention is not to be limited thereby, but its scope is to be determined by the appended claims.

What I claim is:

1. Apparatus of the character described, comprising a device having a control member movable toward and away from two spaced limit positions, a reversible single phase electric motor for actuating said control member, said motor having a power output component selectively rotatable in opposite directions, power transmitting mechanism connecting said power output component and said control member for causing the latter to move from any given operative position of the member in a direction depending upon the direction of rotation of said component, said power transmitting mechanism including speed responsive clutch means in the path of power transmission, said clutch means being responsive to the speed of operation of said power output component and engageable only after said component has reached a predetermined speed of operation in either direction to move the control member away from any given operative position.

2. Apparatus of the character described, comprising a device having a control member movable toward and away from two spaced limit positions, a reversible single phase electric motor for actuating said control member, said motor having a power output component selectively rotatable in opposite directions, power transmitting mechanism comprising a reduction gear connecting said power output component and said control member for causing the latter to move at a speed lower than that of said power output component from any given operative position of the member in a direction depending upon the direction of rotation of said component, said power transmitting mechanism including centrifugal clutch means in the path of power transmission, said clutch means being responsive to the speed of operation of said power output component and engageable only after said component has reached a predetermined speed in either direction to move the control member away from any given operative position.

References Cited in the file of this patent

UNITED STATES PATENTS

| | | |
|---|---|---|
| 712,847 | Pott et al. | Nov. 4, 1902 |
| 1,820,686 | Wise | Aug. 25, 1931 |
| 1,851,146 | Banker | Mar. 29, 1932 |
| 1,908,763 | Kelty | May 16, 1933 |
| 1,917,760 | Geiger | July 11, 1933 |
| 2,000,713 | Norris | May 7, 1935 |
| 2,344,594 | Bryant | Mar. 21, 1944 |
| 2,465,601 | Ochtman | Mar. 29, 1949 |
| 2,514,314 | Denton | July 4, 1950 |